(12) United States Patent
Hartman (10) Patent No.: US 7,398,639 B2
(45) Date of Patent: Jul. 15, 2008

(54) WHEEL DOUBLE GEARS CHAIN DRIVE OF REEL CUTTER GEARS

(76) Inventor: Steven Wayne Hartman, 13510 El Mar Ave., Poway, CA (US) 92064

( * ) Notice: Subject to any disclaimer, the term of this patent is extended or adjusted under 35 U.S.C. 154(b) by 0 days.

(21) Appl. No.: 11/647,840

(22) Filed: Dec. 29, 2006

(65) Prior Publication Data
US 2007/0125057 A1  Jun. 7, 2007

Related U.S. Application Data

(60) Provisional application No. 60/757,210, filed on Jan. 5, 2006.

(51) Int. Cl.
*A01D 34/53* (2006.01)
(52) U.S. Cl. ..................................... 56/249
(58) Field of Classification Search .................. 56/249, 56/294, 7, 11.4, 156, 198, DIG. 6, 20
See application file for complete search history.

(56) References Cited

U.S. PATENT DOCUMENTS

| | | | | |
|---|---|---|---|---|
| 1,344,852 A | * | 6/1920 | Beckner | 56/259 |
| 1,382,089 A | * | 6/1921 | Johnston et al. | 301/6.5 |
| 1,394,351 A | * | 10/1921 | Pribnow | 56/294 |
| 1,454,912 A | * | 5/1923 | Tate, Sr | 56/258 |
| 1,546,981 A | * | 7/1925 | Harris | 191/12 R |
| 1,687,202 A | * | 10/1928 | Haines | 56/252 |
| 1,810,357 A | * | 6/1931 | Lenhart | 56/10.3 |
| 1,823,219 A | * | 9/1931 | Vimtrup | 56/249 |
| 1,836,164 A | * | 12/1931 | Gratiot | 56/253 |
| 2,110,071 A | * | 3/1938 | Pociecha | 56/296 |
| 2,172,786 A | * | 9/1939 | Bishir | 56/238 |
| 2,273,221 A | * | 2/1942 | Roundy | 56/249 |
| 2,826,034 A | * | 3/1958 | Feuerlein | 56/400.02 |
| 2,836,949 A | * | 6/1958 | Cole et al. | 56/11.4 |
| 4,455,816 A | * | 6/1984 | Porath | 56/249 |

* cited by examiner

*Primary Examiner*—Árpád Fábián-Kovács
(74) *Attorney, Agent, or Firm*—Eric Hanscom; Todd Langford (57) ABSTRACT

The invention provides a lawn cutting device utilizing high-tech, lightweight bicycle parts, low-friction bearing assemblies, air-filled bicycle-type tires and a double-overdrive gearing system. The device has a body portion, handlebar, a blade assembly, and a variety of combination of wheel gears, gear rings, and chains, which result in a device which a blade assembly which moves at extremely rapid speeds, powered by the rotation of the wheels. Because of its reliance on low-friction bearings, a minimal amount of force exerted on the wheels is transformed in an extremely efficient manner into the rotation of the blade assembly, resulting in an environmentally friendly, energy efficient cutting device that avoids the pollution, inefficiency, and strain associated with traditional gas, electric, and human-powered lawnmowers.

7 Claims, 10 Drawing Sheets

WHEEL DOUBLE GEARS CHAIN DRIVE OF REEL CUTTER GEARS

CROSS REFERENCE TO RELATED APPLICATIONS

This application claims priority to Provisional Application No. 60/757,210, filed Jan. 5, 2006, a copy of which is attached to this application.

STATEMENT REGARDING FEDERALLY SPONSORED RESEARCH OR DEVELOPMENT

This invention was not federally sponsored.

BACKGROUND

The formal planting of gardens dates way back to the beginnings of recorded history. What began as a desire to plant useful plants and trees closer to the community gradually evolved into individual homeowners designing, planting, and manicuring their yards according to their particular desires. Lawns have played an important role in gardens for several hundred years. However, before Edwin Buddings' 1830 invention of the cutting device predecessor, lawns were normally reserved for the upper classes—those who could afford to hire gardeners to trim their lawns with hand shears.

As the mechanical and electrical arts evolved, so did the quality and complexity of cutting devices. While the first cutting devices were human or animal-driven, the advent of electricity and the gas engines made possible an entirely new method of cutting grass: one that did not require extreme exertion from humans or their work animals. Electric cutting devices have a built-in disadvantage in that to function they need to be hooked up to an electrical outlet, which causes problems when the extension cord being used is shorter than the far reaches of the lawn. Other common problems include a sudden loss of power when the extension cord detaches from either the electrical outlet or from the cutting device, the generally underpowered nature of electric engines that run off 110 Volts, and the danger that a user will cut through the extension cord while running the cutting device back and forth over the same section of grass.

While electrical cutting devices are relatively environmentally-friendly, the same cannot be said for gasoline-powered cutting device. While gasoline-powered cutting devices do not require electrical cords, thereby avoiding two of the main problems inherent in electric cutting devices, and they are generally more powerful than electric cutting devices, there is growing concern over the pollution emanating from them. Indeed, the gasoline-powered cutting device may be the single largest source of completely unregulated pollution in the United States today. Nearly every household has one, they are not required to have catalytic converters, and there are no smog emissions requirements for cutting devices. Indeed, most gasoline-powered cutting devices are built with little room to fine-tune the engine other than replacing the spark plug and cleaning the air filter from time to time. According to some experts, a cutting device will spill out more pollutants in an hour than a well-tuned automobile engine will create in 1,000 hours of driving.

Thus, the pollution resulting from gasoline-powered cutting devices is a major problem and as our society becomes more and more concerned over environmental quality, and with EPA-mandated regulations being imposed in 2007, it will become more and more desirable to use a manually-powered cutting device. Indeed, several states have already implemented programs to decrease the pollutants from gas mowers.

While manual cutting devices avoided the pollution associated with gasoline-powered lawnmowers, the manual mowers invented to date have not been ideal. The major problems with manual cutting devices of the past were that a) they were hard to steer, b) their cutting method was less than optimally efficient, and c) they relied to a large extent on continuous pushing by the user to continue turning the cutting blades; when the user stopped pushing the machines, the blades quickly ground to a stop.

Pollution is not the only drawback to gasoline-powered cutting devices. They are often hard to start, are heavy and hard to push, are very loud, and have engines which require occasional maintenance. Indeed, the gasoline-powered cutting device has not undergone a significant design change in nearly half a century. Thus, there has existed a long-felt need for a human powered cutting device which avoids the problems associated with the current array of human-powered, electric, and gasoline-powered cutting devices.

The current invention provides just such a solution by having a lightweight cutting device, which is easy to push and turn, can be stored conveniently, does not require gasoline or electrical devices to start and function, does not emit pollution, requires minimal maintenance, and cuts grass substantially better than the existing human-powered cutting devices. There are several key elements to this invention. First, the device relies of state-of-the-art bicycle technology, so, rather than trying to make a traditional lawnmower work more efficiently, the inventor has taken a high tech racing bicycle made it cut grass. He has accomplished that by changing the configuration of a bicycle so that rather than having a rider pump peddles to turn wheels, applicant uses the motion of the wheels, generated by having a person push the device, and uses this energy to turn a blade assembly. By using strong yet extremely light weight parts, applicant's device is substantially lighter than traditional lawnmowers, and his use of high tech, low friction bearing assemblies allows the moving parts of his invention—such as the cutting blades—to move at speeds and low levels of friction that are unknown in traditional lawnmowers. Second, while traditional lawnmower rely on a direct gearing between the wheels and blade assembly, applicant uses a variety of gear rings and chains to achieve a mechanical advantage, up to an including a double overdrive system, by which he powers the blade assembly to turn at a rate much higher than possible in a traditional lawnmower. Thus, applicant's invention allows for a much higher rate of movement of blade assembly, where the high rate of movement is sustained for prolonged periods of time because of the low friction, high tech bearings, with minimal effort on the part of the user of the invention. Third, the device relies upon preferably air-filled, spoke rimmed tires, much more similar in weight, size, and appearance to bicycle tires than to the solid plastic or rubber wheels found on traditional lawnmowers. The larger size allows the wheels to easily roll over irregularities in the grass upon which a traditional tire might bog down or even stop. The low friction bearings in the wheels allow the device to move over the ground with considerably less effort than would be needed to move a traditional lawnmower.

In this respect, before explaining at least one embodiment of the invention in detail it is to be understood that the embodiments of the invention are not limited in their application to the details of construction and to the arrangement of the components set forth in the following description or illustrated in the drawings. The embodiments of the invention are capable of being practiced and carried out in various ways. In addition, it is to be understood that the phraseology and terminology employed herein are for the purpose of description and should not be regarded as limiting.

SUMMARY OF THE EMBODIMENTS OF THE INVENTION

The preferred embodiment of the invention is directed to a cutting device including a body portion, a handlebar coupled to one end of the body portion, two wheels coupled to the body portion, each of the two wheels including a wheel gear ring, a blade assembly coupled to the body portion, the blade assembly comprising at least one blade, and a blade assembly drive train, the blade assembly drive train comprised of at least one drive train gear ring coupled on each end of the blade assembly and at least two chains, one end of each of the at least two chains connected to the wheel gear ring of each of the at least two wheels, the other end of each of the at least two chains connected to the at least one drive train gear ring coupled on each end of the blade assembly. The wheel gear rings include close-packed bearings attached thereto.

Another feature of the invention is the double overdrive option, in which the wheel gear ring, referred to as a first gear ring, which can is connected by a chain to another, much small gear ring, called a second gear ring. In the preferred embodiment of the invention, the second gear ring is welded, bolted or otherwise attached to a much larger third gear ring, which is connected by a second chain to a fourth gear ring. The fourth gear ring is attached, directly or indirectly, to the blade assembly. The theory behind the double overdrive design aspect of the invention is that a small amount of rotation of the wheels is transferred into a much larger rotation of the blade assembly, thereby resulting in the cutting blades turning at very high rates of speed as a result of minimal effort for the user of the invention in pushing the device along.

It is envisioned, however, that the invention can also work with the double overdrive unit on either both wheels, or just one wheel. It is also anticipated that the invention could also work without any gear rings or chains, relying instead on pulleys, belts, or cogs meshed with other cogs, and still perform the double overdrive function described in this application.

The body portion is preferably a frame comprising a plurality of connected members connected to one another through bonding, brazing, or welding. The frame is preferably comprised of a strong and lightweight material such as stainless steel, aluminum, carbon graphite, carbon fiber, fiberglass or composite material. A user operates the cutting device by pushing the cutting device using the handlebar, causing the wheel gear ring to rotate, which in turn causes the at least two chains and the at least one drive train gear ring to rotate, causing the blade assembly to rotate, causing the at least one blade to cut a contacted surface.

Another embodiment of the cutting device includes at least two adjustment wheels coupled to the body portion, each of the wheels substantially located on one end of the blade assembly. Each of the adjustment wheels are coupled to the body portion in such a manner as to allow a user to raise or lower the at least two adjustment wheels to adjust the height of the blade assembly.

Still another embodiment of the cutting device includes at least two adjustment wheels coupled to the body portion, each of the wheels substantially located on the end of the body portion opposite of the blade assembly. Each of the adjustment wheels are coupled to the body portion in such a manner as to allow a user to raise or lower the at least two adjustment wheels to adjust the height of the blade assembly. A particularly preferred embodiment has a roller bar replacing the two adjustment wheels, where the roller bar can be adjusted via a telescoping support strut.

Yet another embodiment of the cutting device includes a back-ratcheting mechanism connected to the handlebar. The back-ratcheting mechanism preferably comprises a spring-biased lever, wherein the user can activate the back-ratcheting mechanism by pulling back on the lever, by pulling back on the lever, causing the blade assembly to move in a backward direction.

A further embodiment of the cutting device includes a brake mechanism connected to the handlebar for causing the blade assembly to stop. The brake mechanism preferably comprises a spring-biased lever, wherein the user can activate the brake mechanism by pulling back on the lever.

Both the back-ratcheting mechanism and the brake are additional components borrowed from the bicycle industry. Indeed, the handle portion of the device could look very much like a mountain bike handlebar, with instead of front and rear brakes as handgrips, there would be a single brake and a back-ratcheting mechanism. By using lightweight cables and hand levers made from aluminum alloys or some other lightweight metal or composite, function will be provided with a minimal additional amount of weight.

There has thus been outlined, rather broadly, features of the embodiments of the invention in order that the detailed description thereof may be better understood, and in order that the present contribution to the art may be better appreciated. There are additional features of the embodiments of the invention that will be described hereinafter and which will form the subject matter of the claims appended hereto.

BRIEF DESCRIPTION OF THE DRAWINGS

The accompanying drawings, which are incorporated in and form a part of this specification, illustrate embodiments of the invention and together with the description, serve to explain the principals of the embodiments of the invention.

DETAILED DESCRIPTION OF THE EMBODIMENTS OF THE INVENTION

Figure 1:
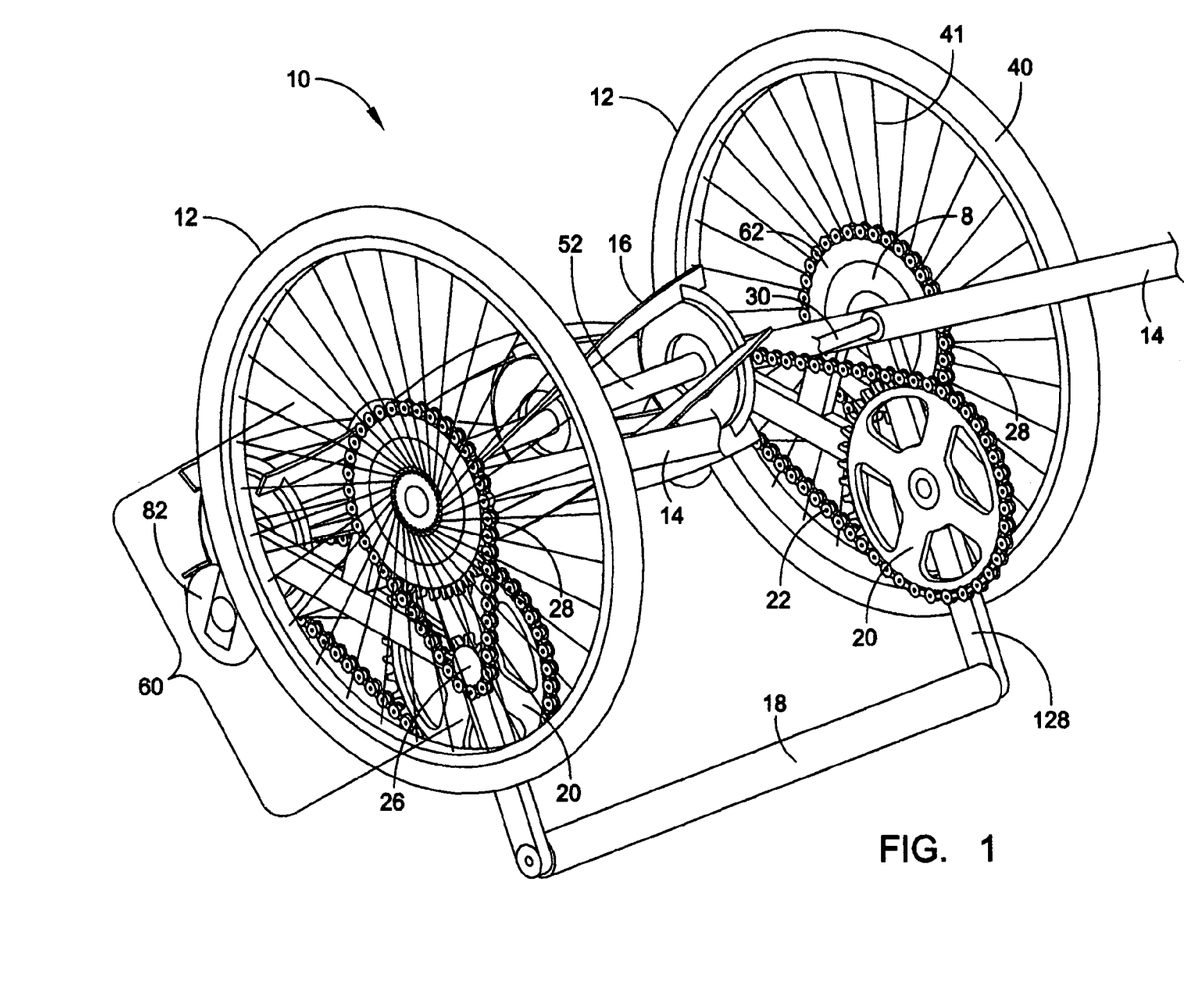
FIG. 1 is a perspective view of the wheel and blade assembly drive train portion of the preferred embodiment of the human-powered cutting device.

Referring now to the drawings, wherein similar parts are identified by like reference numerals, FIG. 1 shows a perspective view of the wheel and blade assembly drive train portion of the preferred embodiment of the human-powered cutting device 10. Device 10 includes body portion 14, a handlebar 36 (see FIG. 6), two wheels 12, a blade assembly 16, and a blade assembly drive train.

Body portion 14 is preferably comprised of a strong and lightweight material such as stainless steel, aluminum, carbon graphite, carbon fiber, fiberglass or composite material. Body portion 14 is preferably a frame comprising a plurality of connected members that are connected to one another by high tech bonding, brazing, and advanced welding techniques that are commonly employed in the manufacture of racing bikes.

A wheel 40 is mounted on the outer portion of each side of body portion 14. To attach each of wheels 12, a tightly spaced, dual-dropout configuration is used which allows wheels 12 to be securely mounted to body portion 14 using only the inside of the wheel hub 8. Wheels 12 are of a larger diameter than that of blade assembly 16, allowing the leading edge of each wheel 40 to extend on approximately the same plane as the leading edge of blade assembly 16. This provides for close spacing between the wheel hubs 42 and the blade assembly bearings (not shown), allowing for a compact and efficient blade assembly drive train. Additionally, cutting device 10 preferably uses close tolerance bearings, allowing for a more quiet and efficient operation. Cutting device can include more than two wheels 12, as would be recognized by one with ordinary skill in the art. For example, it is contemplated that there would be advantages to having two pairs of wheels 12 mounted on either side of cutting device 10.

Wheels 12 are preferably of a bicycle design, with spoke rims 41 and inflatable tires 40. Because wheels 12 have a larger diameter than the wheels typically found on traditional cutting devices, cutting device 10 will roll over irregularities in the ground's surface more easily that those found on traditional cutting devices, which tend to catch in small ruts and skid to a stop over small dirt clods and rocks. The use of high technology, sealed bearings on cutting device 10 also allows wheels 12 to move more efficiently than typical wheels found on traditional cutting devices, which are usually just a solid rubber disk with a hole in the center which rotates, without bearings, over an axle.

Blade assembly 16 comprises an axle 52, one or more connection members (not shown in this figure but see FIG. 2, 54), and one or more blades 14. Preferably, blade assembly contains three connection members 54 to provide optimum support to blades 14. Blades 14 can be reel-type, overdriven blades with close tolerance bearings. Blade assembly 16 is configured such that it will continue to spin for a substantial period of time after the user stops pushing cutting device 10.

Blades 14 can comprise finely machined blades and can each be made from heavy gauge stainless steel, titanium graphite, or a more exotic composite material. The design of blades 14 and the blade bearings (not shown) will minimize centrifugal resistance, thereby significantly reducing the amount of energy needed to start and maintain the rotation of blade assembly 16. As the user pushes cutting device 10, blades 14 are engaged due to the freewheel design of blade assembly 16.

Blade assembly 16 is driven by a double overdrive system blade assembly drive train 60, powered by the turning wheels 12. Mounted to each wheel hub 42 is a first gear ring 62. A first gear ring chain 28 is attached on one end to first gear ring 62 and on the other end to a second gear ring 26. Second gear ring 26 is attached to a third gear ring 20. A second gear ring chain 22 is attached on one end to third gear ring 20 and on the other end to a fourth gear ring 32 (see FIG. 6). Fourth gear ring 32 is attached to blade assembly 16, preferably axle 52. To provide support, each of second gear rings 26 is attached to gear ring cross-brace 30 (see also FIG. 4).

Figure 12:
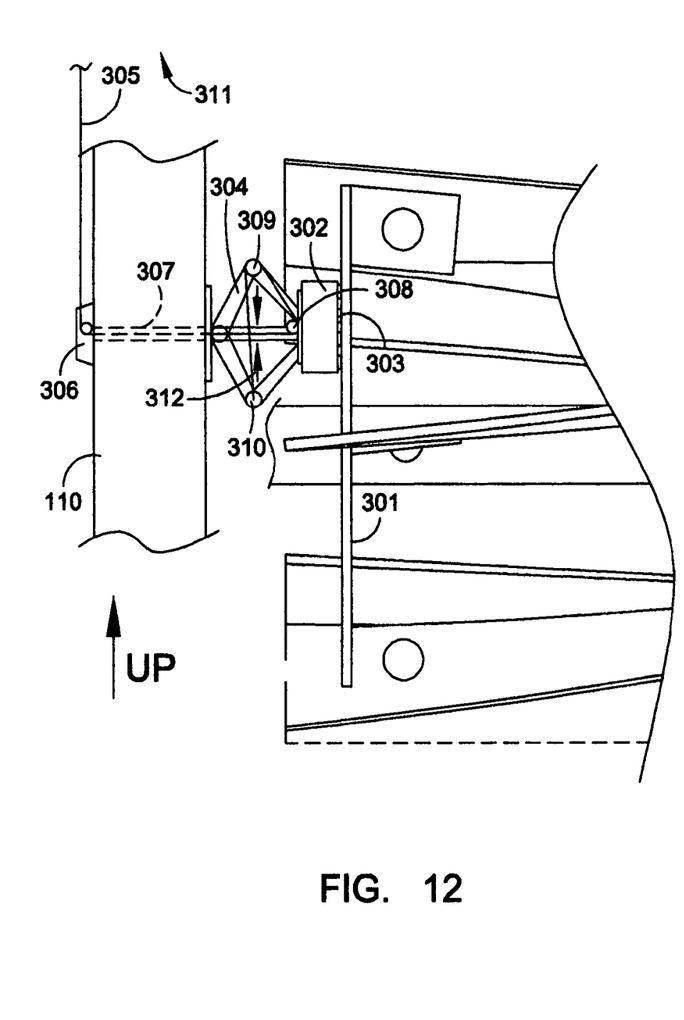
FIG. 12 is a side view of the braking mechanism.

This configuration of blade assembly drive train 60 allows for a small push forward on cutting device 10 to translate into a rapid turning of blade assembly 16. The configuration of blade assembly drive train 60, combined with a number of different weighting methods that can be used to add weight to axle 52 or blades 56, once blade assembly 16 is set in motion, it will continue to spin at a high speed for long after the user has stopped pushing cutting device 50. It is through this method that cutting device 10 is particularly useful in cutting grass or other surfaces in tight corners where it is impossible to "push" cutting device 10 through the desired cut. The ability of blade assembly 16 to continue to spin without additional pushing of cutting device 10 by the user results in the need for a blade brake (as shown in FIG. 12) connected to body portion 14. Blade brake 302 is operated by a wire 305 attached to a handlebar grip 36 which is pressed similar to how a bicycle brake is pressed.

Figure 6:
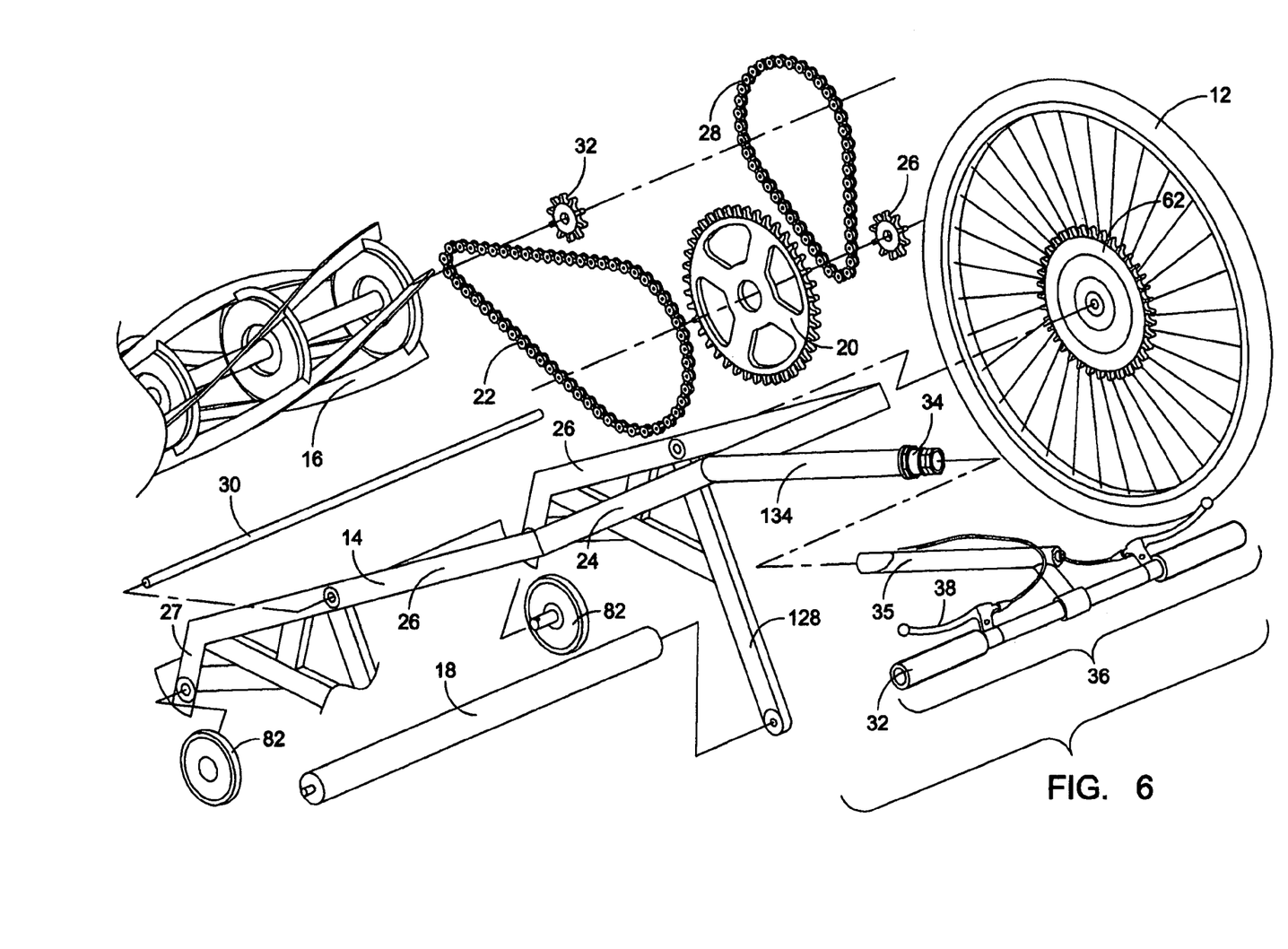
FIG. 6 is an exploded view of one end of the components of the preferred embodiment of the human-powered cutting device.

Body portion 14 can also include a back roller 18 attached to brace members 128 (see also FIG. 6). Roller 80 serves the dual functions of supporting cutting device 10 as it moves along a surface, and shaping the surface to be cut. Roller 18 can also serve as a means for adjusting the cutting height of blade assembly 16, through adjustment of the diameter the roller 80 used, or through adjustment of the angular positioning of the attachment of roller 80 to body portion 14. In another embodiment, roller 80 can be replaced with a wheel connected to each end of brace members 28 (see FIG. 6). Roller 18 can also be, optionally, adjustable to allow for different cutting heights of grass through use of a telescoping support shaft or strut, shown in more detail in FIG. 10. In a further embodiment, body portion can include two front wheels 90, or a front roller (not shown), which can serve the same as roller 80.

A user operates cutting device 10 by pushing cutting device 10 using handlebar 36, causing first gear ring 62 to rotate, which in turn causes first gear ring chain 28 and second gear ring 26 to rotate, causing third gear ring 20 and second gear ring chain 22 to rotate, causing fourth gear ring 32 to rotate and cause blade assembly 16 to rotate, causing blades 14 to cut a contacted surface.

Body portion 14 is preferably comprised of a strong and lightweight material such as stainless steel, aluminum, carbon graphite, carbon fiber, fiberglass or composite material. Body portion 14 is preferably a frame comprising a plurality of connected members that are connected to one another by high tech bonding, brazing, and advanced welding techniques that are commonly employed in the manufacture of racing bikes.

A wheel 12 is mounted on the outer portion of each side of body portion 14. To attach each of wheels 12, a tightly spaced, dual-dropout configuration is used which allows wheels 12 to be securely mounted to Body portion 14 using only the inside of the wheel hub. Wheels 12 are of a larger diameter than that of blade assembly 16, allowing the leading edge of each wheel 12 to extend on approximately the same plane as the leading edge of blade assembly 16. This provides for close spacing between the wheel hubs and the blade assembly bearings (not shown), allowing for a compact and efficient blade assembly drive train 60. Additionally, cutting device preferably uses close tolerance bearings, allowing for a more quiet and efficient operation. Cutting device can include more than two wheels 12, as would be recognized by one with ordinary skill in the art.

Wheels 12 are preferably of a bicycle design, with spoke rims 41 and inflatable tires 40. Because wheels 12 have a larger diameter than the wheels typically found on traditional cutting devices, cutting device 10 will roll over irregularities in the ground's surface more easily that those found on traditional cutting devices, which tend to catch in small ruts and skid to a stop over small dirt clods and rocks. The use of high technology, sealed bearings on cutting device 10 also allows wheels 12 to move more efficiently than typical wheels found on traditional cutting devices, which are usually just a solid rubber disk with a hole in the center which rotates, without bearings, over an axle.

Blade assembly 16 comprises an axle 52, one or more connection members (54 in FIG. 2), and one or more blades 14. Blades 14 can be reel-type, overdriven blades with close tolerance bearings. Blade assembly 16 is configured such that it will continue to spin for a substantial period of time after the user stops pushing cutting device 10.

The optional use of a flywheel is also contemplated, wherein the blade assembly further comprises an adjustable weight to allow a user to adjust the weight of the blade assembly to alter the cutting performance of the cutting device.

Blades 14 can comprise finely machined blades and can each be made from heavy gauge stainless steel, titanium graphite, or a more exotic composite material. The design of blades 146 and the blade bearings (not shown) will minimize centrifugal resistance, thereby significantly reducing the amount of energy needed to start and maintain the rotation of blade assembly 16. As the user pushes cutting device 10, blades 14 are engaged due to the freewheel design of blade assembly 16.

It is also envisioned that the conversion of rotational energy from the wheels 12 could be converted in energy to turn the blades 146 could be accomplished by means other than gears and chains. For example an arrangement of belts and/or pulleys could connect a rotating axle or similar to a blade mechanism and transfer energy from the wheel revolutions to a cutting assembly. It is also anticipated that a system of Cogs and Gears could also accomplish the mechanical advantage of gear rings of different sizes connected by chains.

Figure 2:
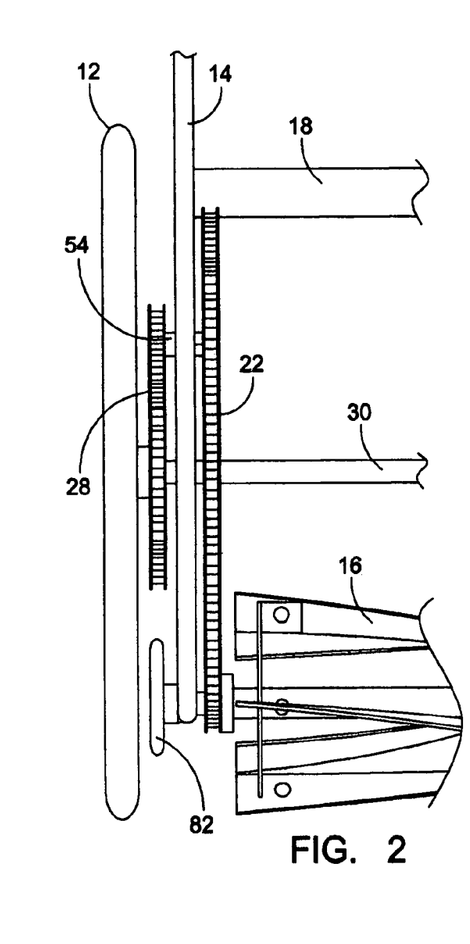
FIG. 2 is a detailed side view of one end of the blade assembly drive train of the preferred embodiment of the human-powered cutting device.

FIG. 2 is a detailed side view of one end of the blade assembly drive train of device 10. This figure illustrates the spatial relationship between wheel 12, first gear ring chain 28, second gear ring chain 22, side support 14, gear ring cross brace 30, support wheels 24, and blade assembly 16.

Figure 3:
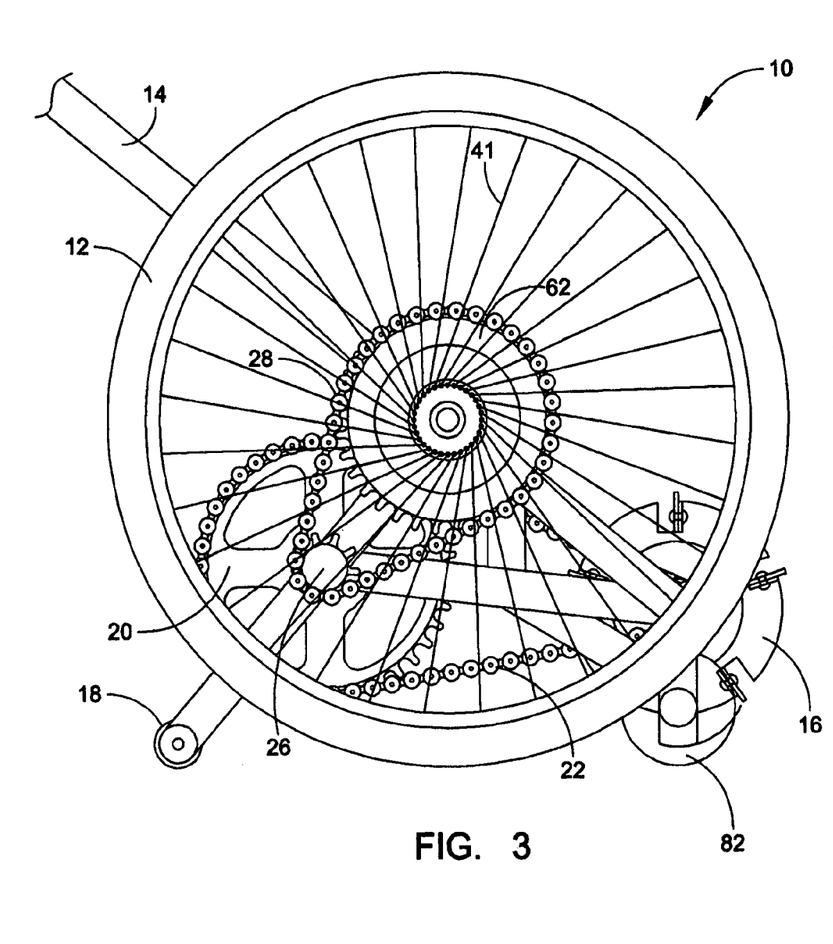
FIG. 3 is a side view of the one end of the preferred embodiment of the human-powered cutting device.

FIG. 3 is a side view of the one end of device 10. This figure illustrates the relationship between wheel 12, first gear ring 62, first gear ring chain 28, second gear ring 26, third gear ring 20, and second chain 22.

Figure 4:
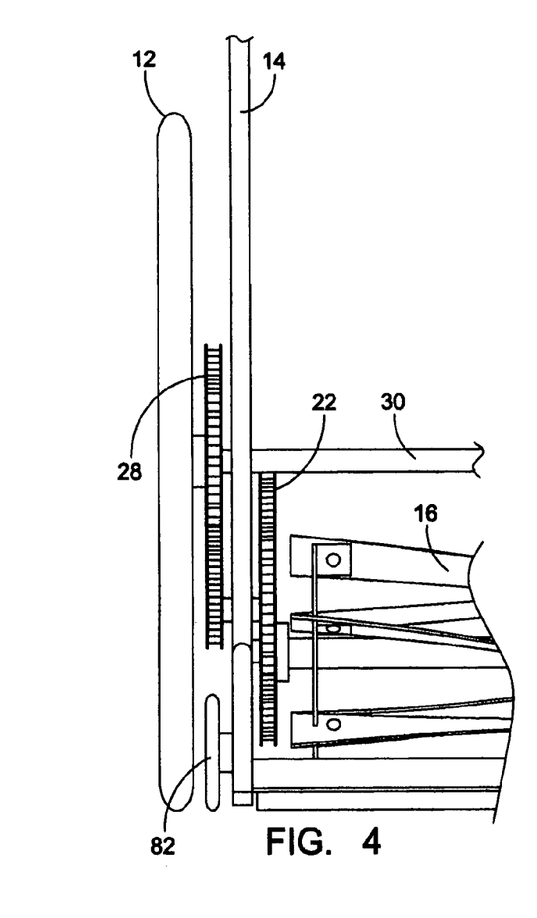
FIG. 4 is a detailed side view of the other end of the blade assembly drive train of the preferred embodiment of the human-powered cutting device.

FIG. 4 is a detailed side view of the other end of the blade assembly drive train of device 10. This figure illustrates the spatial relationship between wheel 12, first gear ring chain 28, second gear ring chain 22, side support 24, gear ring cross brace 30, support wheels 24, and blade assembly 16.

Figure 5:
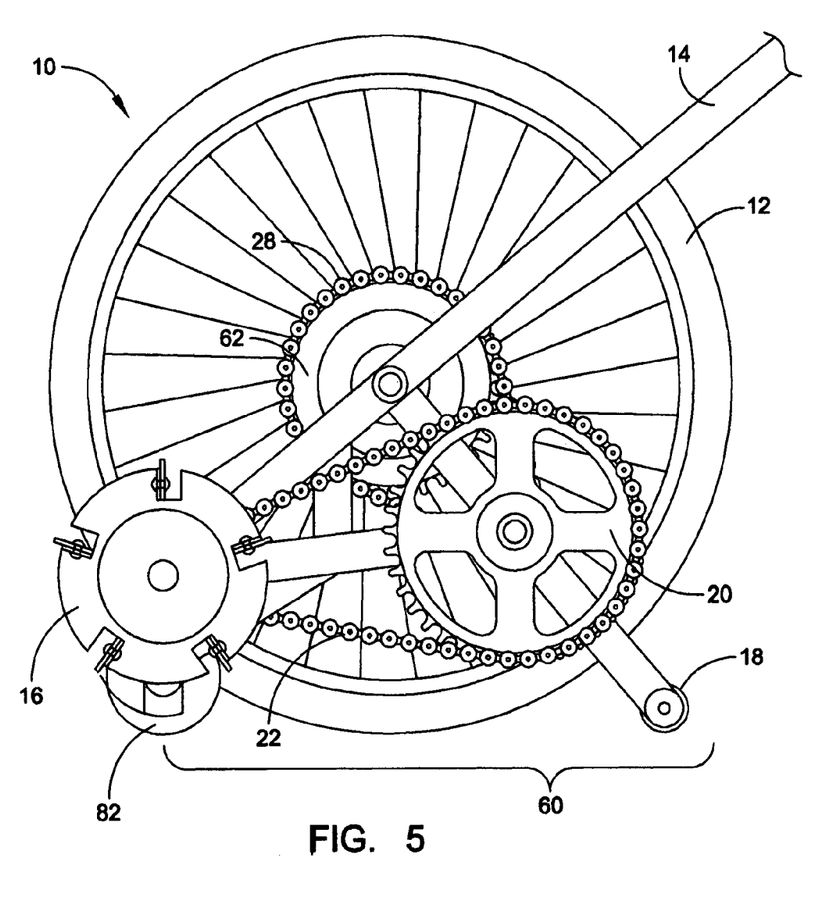
FIG. 5 is a side view of the preferred embodiment of the human-powered cutting device, with one wheel removed, illustrating the blade assembly drive train.

FIG. 5 is a side view of device 10, with one wheel 12 removed, illustrating the blade assembly drive train 60, including the relationship between wheel 12, first gear ring 62, first gear ring chain 28, third gear ring 20, second gear ring chain 22, and blade assembly 16.

FIG. 6 is an exploded view of one end of the components of device 10. Body portion 14 includes a handlebar member 134 connected on one end to a side support member 24. Handlebar member 134 is preferably connected at the midpoint of, and perpendicular to, side support member 24. Handlebar member 134 can contain an adjustable stem 34 attached to the other end thereof, to allow for the adjustable attachment of handlebar 36. Attached on each end of side support member 24 is a side support 26. Side support member 24 and side supports 26 are preferably attached at right angles with respect to one another. The distal end of each of side supports 26 can contain a bend 27 that directs the end of side support 26 in a downward direction. This configuration allows for the attachment of one or more support wheels 82 to side supports 26. A brace member 30 can be attached at the midpoint of, and perpendicular to each of side supports 26. Brace members 128 provide attachment points for roller 18, to provide support for device 10 while it moves along a surface.

Handlebar 36 is preferably configured similar to a mountain bike handlebar. Handlebar 36 comprises a grip member 32 and a body attachment portion 35. Grip member 32 and body attachment portion 34 are connected by sliding handlebar member 134 over adjustable stem 34. Grip member 32 can include a grip 38 on each end. Grip 38 can comprise foam or other comfortable material as would be recognized in the art.

Cutting device 10 can further include a back-ratcheting mechanism (201 in FIG. 11) attached to handlebar 36, preferably grip member 32 on the opposite end of handlebar 36 from brake 38. Back-ratcheting mechanism 201 allows a user to clear blade assembly 16 of sticks or other debris that may prevent blade assembly 16 from spinning. Back-ratcheting mechanism 201 is preferably a lever, and is operated by a user pulling back it, causing an attached cable (401 in FIG. 13) to ratchet back the blade assembly 16 utilizing any of the commonly known back-ratcheting mechanisms known in the art.

Figure 7:
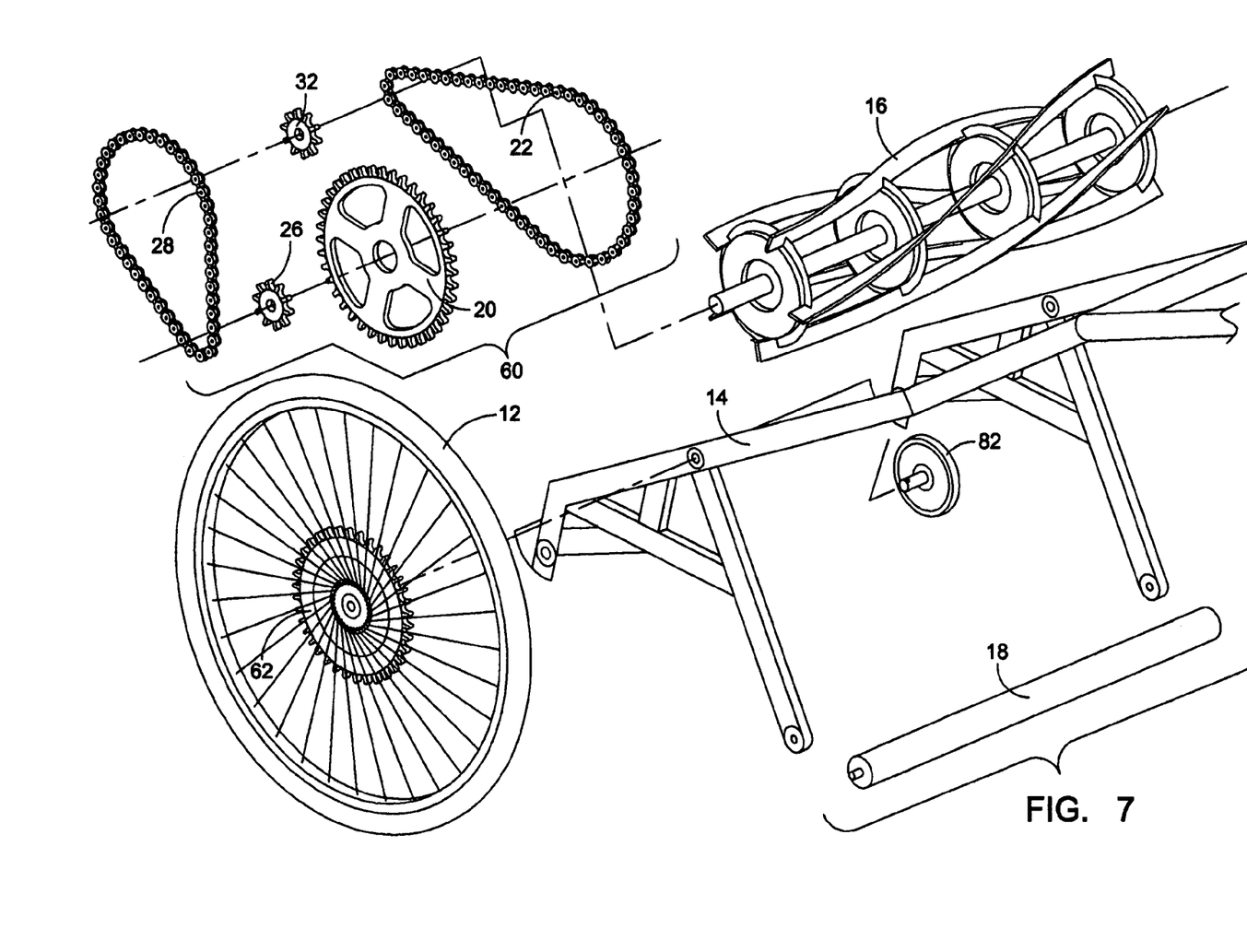
FIG. 7 is an exploded view of the other end of the components of the preferred embodiment of the human powered cutting device.

FIG. 7 is an exploded view of the other end of the components of device 10. This figure illustrates the relationship between body portion 14, wheels 12, blade assembly 16, and blade assembly drive train 60.

Figure 8:
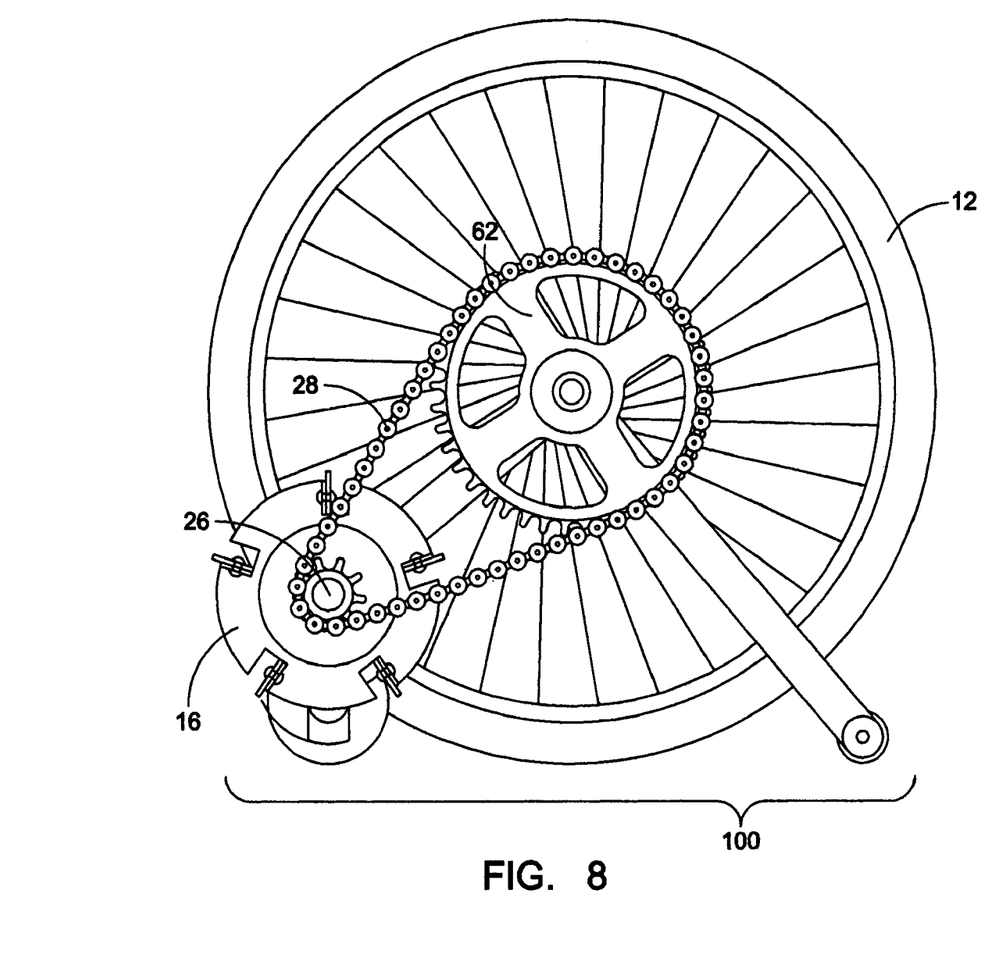
FIG. 8 is a side view of the wheel and blade assembly drive train portion of another embodiment of the human-powered cutting device where there is a single gear chain connecting a first gear ring attached to the wheel to a second gear ring attached to the cutting device.

FIG. 8 shows a side view of another embodiment of cutting device 100, which has a single drive on both wheels rather than double drive on one. Cutting device 100 includes body portion and a handlebar (not shown in this figure), two wheels 12, a blade assembly 16, and a blade assembly drive train which consists of a first gear ring (62) which is attached to wheel 12, a gear chain 28, and a second gear ring 26 which is attached to cutting device 16. While this version of the invention does not feature the double overdrive system, changing the size of first gear ring 62 can increase the number of revolutions of cutting device 16 for each turn of wheel 12.

Figure 9:
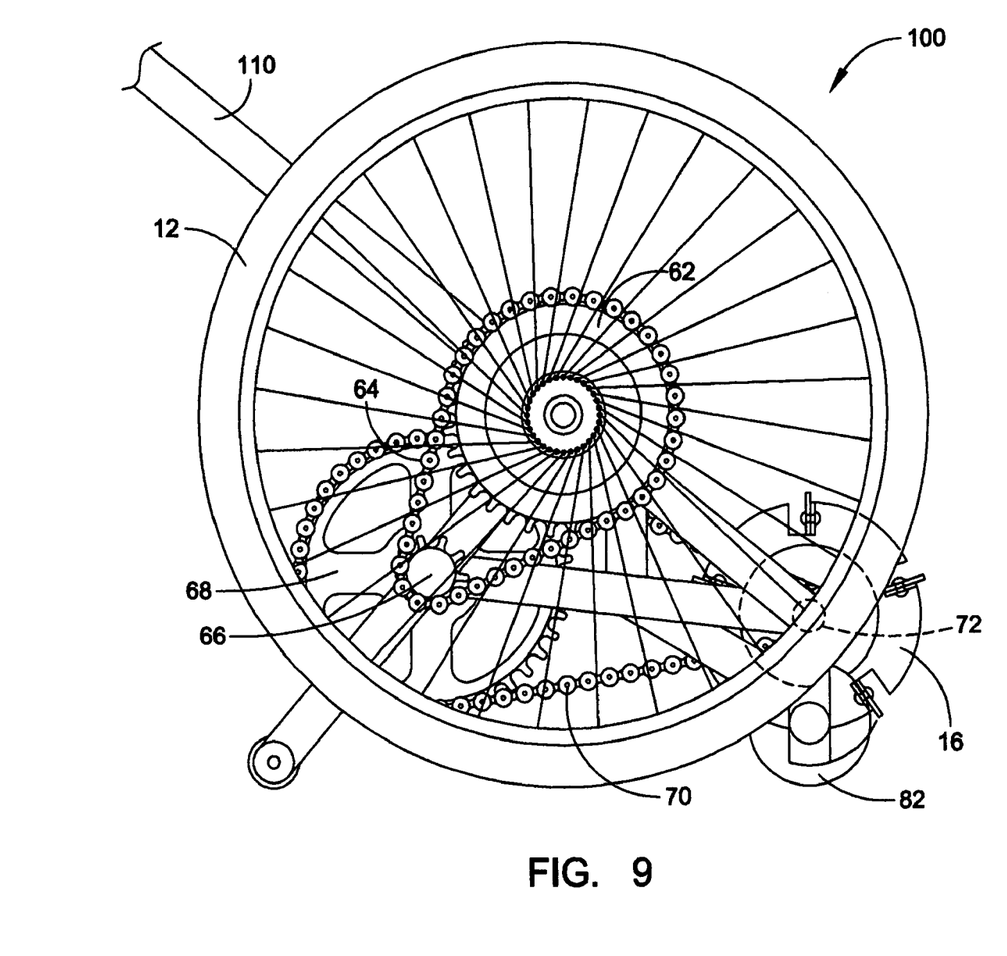
FIG. 9 is a side view of another iteration of the invention where the wheel and drive assembly turn a shaft between the two wheels which rotates the cutting blades.

FIG. 9 is a side view of another iteration of the invention, generally referenced by 100, where the wheel and drive assembly turn a shaft between the two wheels 12 which rotates the blade assembly 16. In this iteration, a first wheel gear ring 62 is rotated as the wheel 12 is turned, which causes a first chain 64 to turn a second gear ring 66. The second gear ring 66 is attached to a second gear 68 which turns a second chain 70, which mates with gears on a shaft 72, attached to the frame 110. The shaft 72 extends from one wheel to the other and is supported by support wheel 82 and frame 110. The cutting blades 50 are attached to the shaft 72 such that as shaft 72 is rotated, the cutting blades 50 also rotate and cut grass as the invention 100 is pushed along. It should be noted that a preferred embodiment of this invention has a complete set of gear rings and chains on both wheels, and a particularly preferred embodiment has the wheel gear ring, second gear ring, first chain, second chain, and second gear only on one side of the cutting device, thereby decreasing cost and providing a cutting machine that is lighter in weight than one in which wheel and drive assemblies are located next to both wheels.

Figure 10:
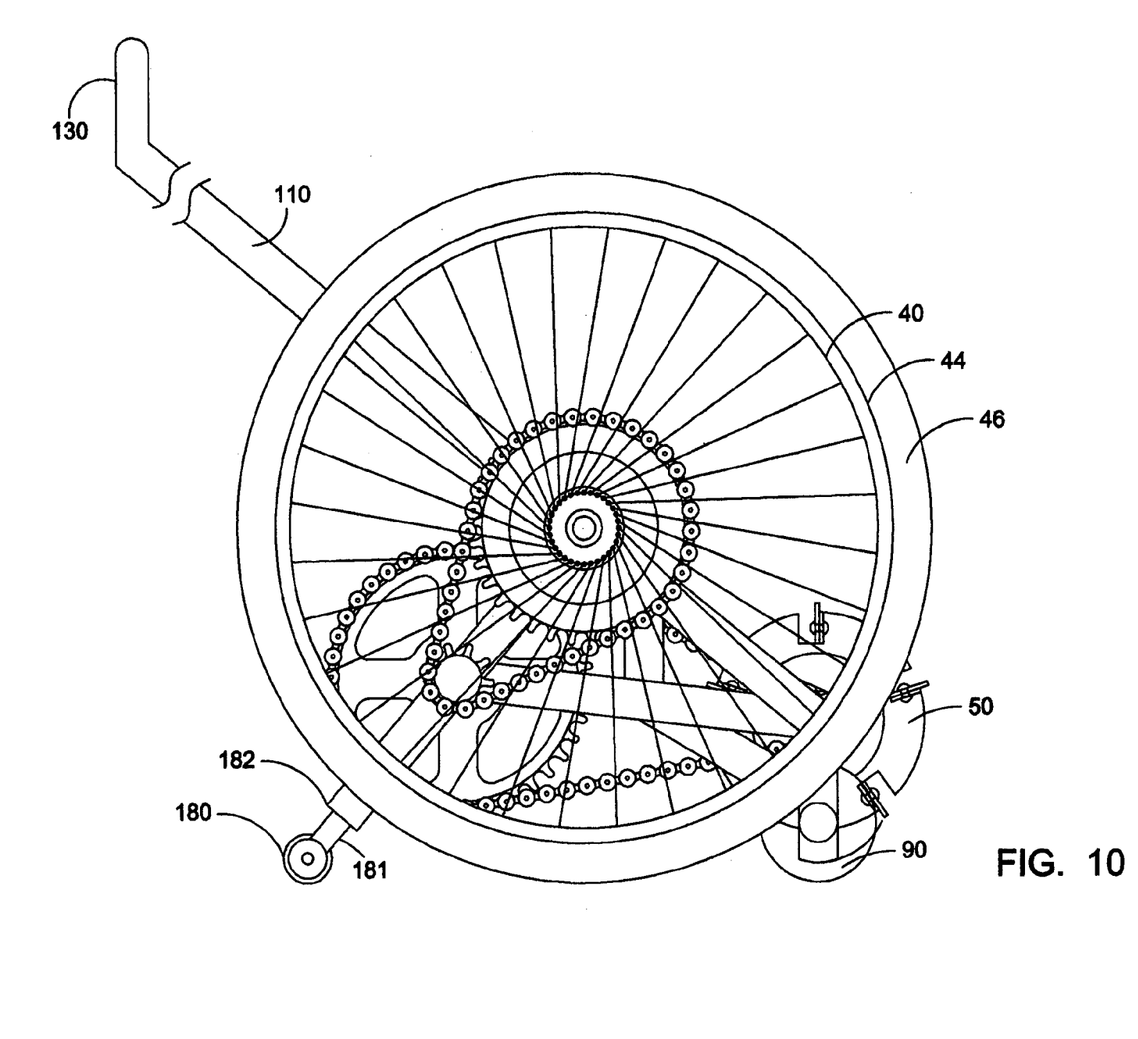
FIG. 10 is a side view of the invention of FIG. 9, showing the telescoping roller and the location of the hand brake and back-ratcheting mechanisms.

FIG. 10 is a side view of the invention of FIG. 9, showing the telescoping roller 181 and the location of the hand brake and back-ratcheting mechanisms 130. The telescoping roller 181 consists of a back roller 180 and a telescoping shaft 182. The back roller 180 is a wheel which allows the invention to roll over grassy surfaces in a level manner, by serving to even out the distance between the cutting blades and the grass. The telescoping shaft 182 allows a user of the invention to adjust the distance between the back roller 180 and the frame 110, such that the height that the cutting surfaces are extended above the grass can be adjusted to suit different grass cutting situations. Near the top of frame 110 there is a handlebar portion 130 which is bent in an upward manner and provides hand grips for the person pushing the invention along with serving as the base to which the hand brake and back ratcheting mechanisms are attached.

Figure 11:
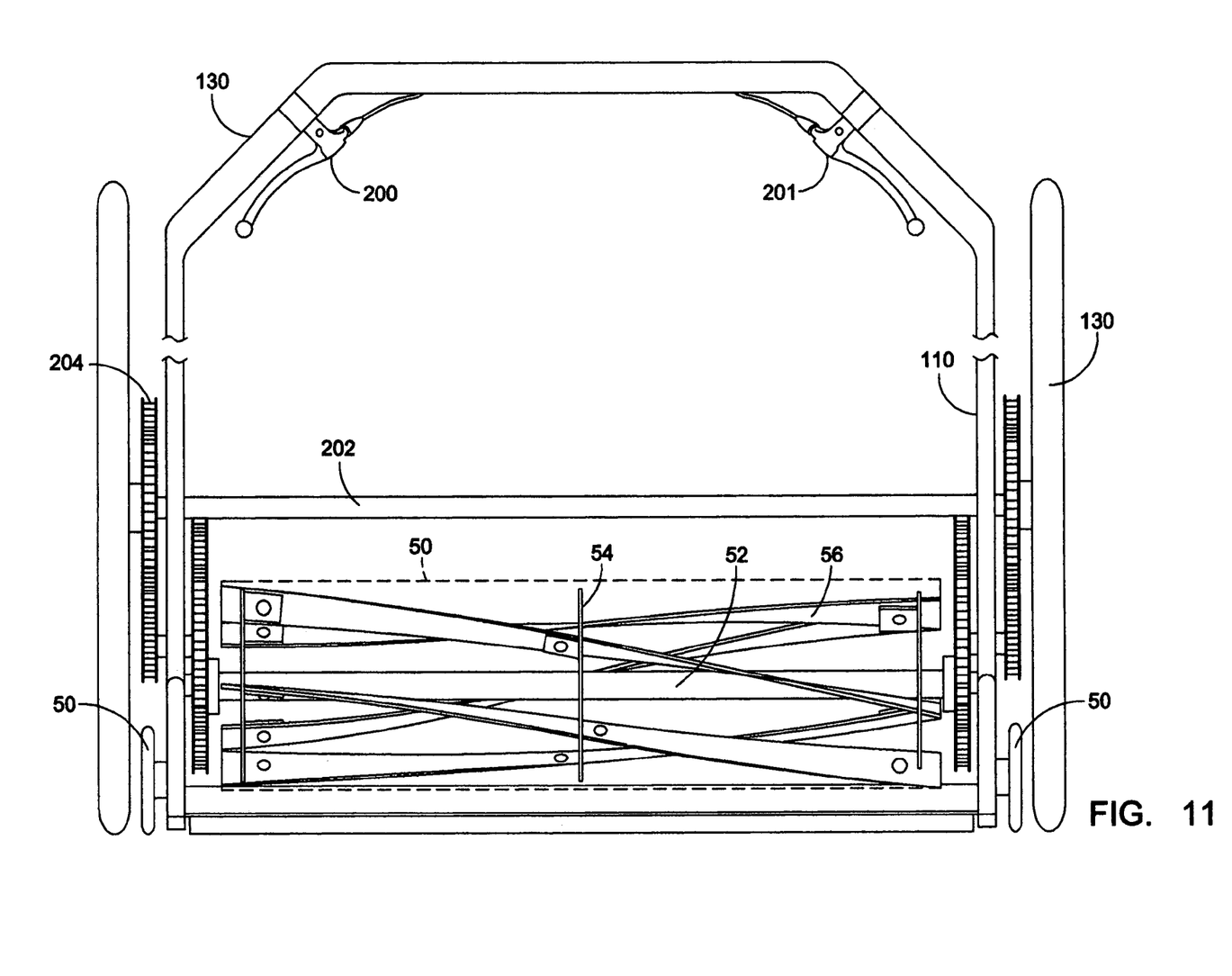
FIG. 11 is a front view of the invention of FIG. 9, showing the telescoping roller and the location of the hand brake and back-ratcheting mechanisms.

FIG. 11 is a front view of the invention of FIG. 9, showing the location of the hand brake 200 and back-ratcheting handle 201. In this view, the drive system 204 is located on only one side of the invention. By having only one set of gears and chains, the invention will cost less and weigh less.

FIG. 12 is a side view of the braking mechanism. A cable 305 extends from the hand brake (200 in FIG. 11) over a wire guide 206, through a hole 307 in the frame 110. The cable 305 then thread over a brake pulley 308 mounted on a flexible lattice 304, over a directional pulley 309 also attached to the flexible lattice, and is attached at a directional terminal 310, also on the flexible lattice, such that as a user pulls the cable 305 in an upward direction 311, by pulling on the hand brake, the cable 305 pulls against the directional terminal 310, causing the flexible lattice 304 to compress in a vertical direction 312, forcing a brake shoe 302, which brake pads 303, to move laterally and contact the rim 301 of the cutting mechanism. The brake pads 303 cause friction with the rim 301, causing the cutting mechanism to slow down or stop rotating entirely, depending on the amount of pressure exerted on the hand brake and the length of time over which the pressure is exerted.

Figure 13:
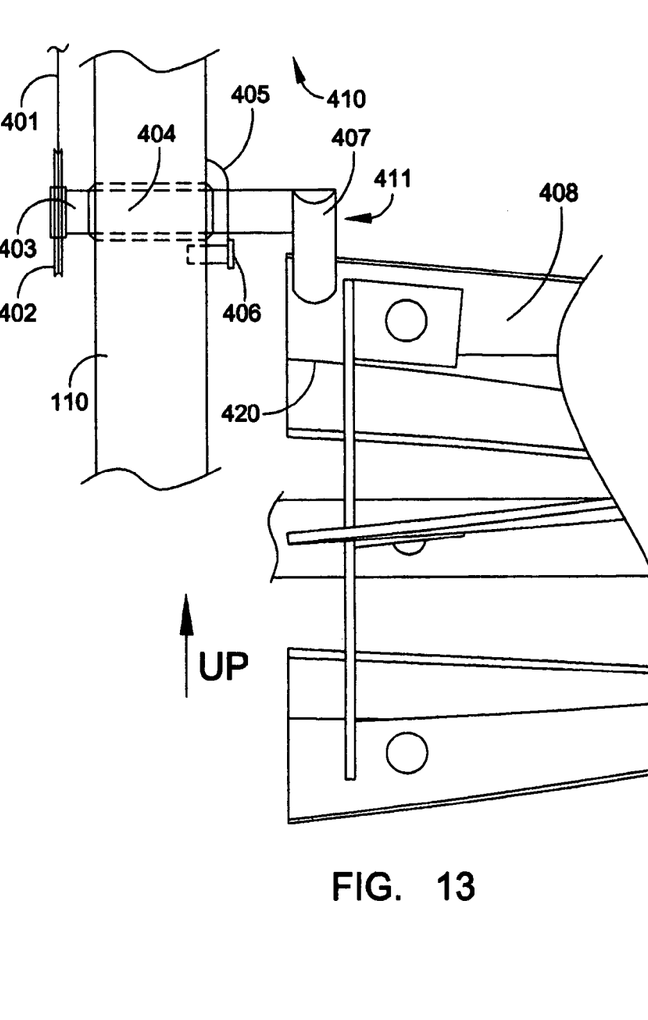
FIG. 13 is a side view of the back-ratcheting mechanism.

FIG. 13 is a side view of the back-ratcheting mechanism. A wire 401 extends downward from the back-ratcheting handle (201 in FIG. 11) and winds around a cog 402, which is attached to an axle 403. Axle 403 extends through frame 110 in a hole 404, and terminates in a flange 407 which is attached at 90 degrees to the direction of the axle 403. The flange 407 sits above the gaps 408 between the cutting blades 420, such that by pulling on the back-ratcheting handle, the user of the invention causes wire 401 to move upward 410, thereby turning cog 402, which in turn causes axle 403 to rotate, which causes flange 407 to rotate in a downward manner and forcibly push the nearest cutting blade in a backward direction, thereby causing the cutting blade to dislodge any particles, garbage or sticks that have jammed the cutting blades.

With respect to the above description it is to be realized that the optimum dimensional relationships for the parts of the invention, including variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents fall within the scope of the present invention.

The above description, together with the advantages of the invention and the various features of novelty which characterize the invention, are pointed out with particularity in the claims annexed to and forming a part of this disclosure. For a better understanding of the invention, its operating advantages and the specific advantages attained by its uses, reference should be made to the accompanying drawings and descriptive matter in which there are illustrated preferred embodiments of the invention.

Further, the purpose of the foregoing abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting, as to the scope of the invention in any way.

What is claimed is:

1. A cutting device comprising:
   a) a body portion;
   b) a handlebar coupled to one end of the body portion;
   c) at least two wheels coupled to the body portion, each of the at least two wheels including a wheel gear ring;
   d) a blade assembly coupled to the body portion, where the blade assembly comprises at least one blade; and
   e) two blade assembly drive trains, where each blade assembly drive train comprises a first gear ring coupled on one end of the blade assembly, a first chain attached on one end to the first gear ring, a second gear ring attached to the other end of the first chain, a third gear ring attached to the second gear ring, and a second chain attached on one end to the third gear ring and on the other end to the wheel gear ring; and
   whereby a user pushes the cutting device using the handlebar, causing the wheel gear ring of each wheel to rotate, which in turn causes the second chain and third gear ring to rotate, causing the second ring and the first chain to rotate, causing the first gear ring of each blade assembly drive train and the blade assembly to rotate, causing the at least one blade to cut a contacted surface.

2. The cutting device of claim 1 further comprising a roller, which is a cylindrical member attached at each end to the body portion on the opposite end of the blade assembly.

3. The cutting device of claim 2, additionally comprising two or more telescoping support members, where at least one telescoping support member is attached at each end of the roller, and where the two or more telescoping support members connect the roller to the body portion, and, whereby a user can adjust the height of the telescoping support members to adjust the cutting level of the cutting device.

4. The cutting device of claim 1 further comprising a back-ratcheting mechanism and a brake, where the back-ratcheting mechanism and the brake are spring-biased levers connected to the handlebar.

5. The cutting device of claim 1, wherein the blade assembly further comprises:

a) a central axle; and b) a plurality of blade members coupled to the central axle by at least one connecting member, plurality of blade members curved such that each of the plurality of blade members sequentially engages the contacted surface surface.

6. The cutting device of claim 1, wherein the blade assembly further comprises a flywheel, where the flywheel comprises an adjustable weight to allow a user to adjust the weight of the blade assembly to alter the cutting performance of the cutting device.

7. A cutting device comprising:

a) a body portion;

b) a handlebar coupled to one end of the body portion;

c) at least two wheels coupled to the body portion, where one wheel includes a wheel gear ring;

d) a blade assembly coupled to the body portion, the blade assembly comprising at least one blade; and e) a blade assembly drive train, the blade assembly drive train comprised of a second gear ring attached to a third gear ring, and a fourth gear ring coupled on one end of the blade assembly and two chains, a first chain and a second chain, where the first chain connects the wheel gear ring to the second gear ring, and the second chain connects the third gear ring to the fourth gear ring, and where the fourth gear ring is attached to an end of the blade assembly, whereby a user pushes the cutting device using the handlebar, causing the wheel gear ring to rotate, which in turn causes the chain to rotate, causing the second gear and third gear to rotate, causing the second chain to rotate, causing the fourth gear to rotate, causing the blade assembly to rotate, causing the at least one blade to cut a contacted surface.

* * * * *